(12) United States Patent
Miranda et al.

(10) Patent No.: US 6,523,043 B1
(45) Date of Patent: Feb. 18, 2003

(54) SYSTEM AND METHOD FOR UPDATING, MONITORING AND ANALYZING MEASUREMENTS

(75) Inventors: Todd A. Miranda, Hoover, AL (US); Louis M. Jamison, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/536,410

(22) Filed: Mar. 28, 2000

(51) Int. Cl.[7] ............................. G06F 17/30; G06F 17/00
(52) U.S. Cl. ........................................ 707/102; 707/526
(58) Field of Search ............................... 707/3, 102, 5, 707/526, 9, 500

(56) References Cited

U.S. PATENT DOCUMENTS

| | | | |
|---|---|---|---|
| 5,802,515 A | * | 9/1998 | Adar et al. ................. 707/5 |
| 5,802,518 A | * | 9/1998 | Karaev et al. ............... 707/9 |
| 5,907,837 A | * | 5/1999 | Ferrel et al. ................ 707/3 |
| 5,987,454 A | * | 11/1999 | Hobbs ....................... 707/4 |

* cited by examiner

*Primary Examiner*—Wayne Amsbury
*Assistant Examiner*—Cam-Linh T. Nguyen
(74) *Attorney, Agent, or Firm*—Shaw Pittman LLP (57) ABSTRACT

A system and method of tracking the performance characteristics of an organization including storing a plurality of measurements in a database and organizing the plurality of measurements into packages that are displayed on a computer via an electronic network. A target value is associated with at least one of the measurements and a measurement value is color coded based on the relative value of the measurement value with respect to the target value. An indicator that indicates whether it is desirable for the measurement value to be increasing or decreasing towards the target value is also displayed.

13 Claims, 7 Drawing Sheets

Measurement Summary

| Date | Measurement | Value | | Target | Description | Options | |
|---|---|---|---|---|---|---|---|
| January, 2000 | Financial Rptg. - $ Billing Errors Found | R | 0 | 1000↑ | | + | ? |
| January, 2000 | Financial Rptg. - $ Revenue Errors Found | R | 3163 | 17220↑ | | + | ? |
| January, 2000 | Financial Rptg. - No Billing Errors Found | | 0 | N/A | | + | ? |
| January, 2000 | Financial Rptg. - No. of Inquiries Received | | 95 | N/A | | + | ? |
| January, 2000 | Financial Rptg. - No Revenue Errors Found | | 8 | N/A | | + | ? |
| December, 1999 | Process Improvements - Calls | | 25 | N/A | Data Related | + | ? |
| May, 1999 | Process Improvements - Contact Administration | | 40 | N/A | Active Contacts | + | ? |
| December, 1999 | Process Improvements - Hours Saved | G | 18913 | 10000↑ | | + | ? |

Figure 4

Measurement Detail
Financial Rptg - $ Billing Errors Found

| Date | Value | Value | Target | Analysis |
|---|---|---|---|---|
| January, 2000 | R | 0 | 1000 | |
| December, 1999 | G | 9370 | 1000 | |
| November, 1999 | G | 7714 | 1000 | |
| October, 1999 | G | 6799 | 1000 | |
| September, 1999 | G | 6799 | 1000 | |
| August, 1999 | G | 6533 | 1000 | |
| July, 1999 | G | 5415 | 1000 | |
| June, 1999 | G | 298 | 1000 | |
| May, 1999 | G | 4172 | 1000 | |
| April, 1999 | R | 893 | 1000 | |
| March, 1999 | R | 740 | 1000 | |
| February, 1999 | R | 167 | 1000 | No analysis provided |
| January, 1999 | R | 167 | 1000 | No analysis provided |
| December, 1998 | G | 2366 | 1000 | No analysis provided |
| November, 1998 | G | 0 | 1000 | No analysis provided |
| October, 1998 | R | 273 | 1000 | No analysis provided |
| September, 1998 | R | 0 | 1000 | No analysis provided |
| August, 1998 | R | 679 | 1000 | No analysis provided |
| July, 1998 | R | 0 | 1000 | No analysis provided |
| June, 1998 | R | 450 | 1000 | No analysis provided |

FIGURE 5a

Measurement Detail
Process Improvements - Project Hours (%)

| Date | Series | Value | Target | Analysis |
|---|---|---|---|---|
| December, 1999 | Development | 77 | 75 | |
| | Total | G 77 | 75 | |
| November, 1999 | Development | 72 | 75 | 72% monthly, 74% year-to-date Maintenance of CEO file caused lower percent each month. Jodi has spent most of her time maintaining CEO versus new project hours. |
| | Total | R 72 | 75 | 72% monthly, 74% year-to-date Maintenance of CEO file caused lower percent each month. Jodi has spent most of her time maintaining CEO versus new project hours. |
| October, 1999 | Development | 76 | 75 | No analysis provided |
| | Total | G 76 | 75 | No analysis provided |
| September, 1999 | Development | 65 | 75 | No analysis provided |
| | Total | R 65 | 75 | No analysis provided |
| August, 1999 | Development | 72 | 75 | Time spent on training new employees and Plan |
| | Total | R 72 | 75 | Time spent on training new employees and Plan |
| July, 1999 | Development | 82 | 75 | No analysis provided |
| | Total | G 83 | 75 | No analysis provided |
| June, 1999 | Development | 71 | 75 | No analysis provided |
| | Total | R 71 | 75 | No analysis provided |

Measurement or Package to Graph:
| ← ———— Measurement ———— → |

Graph Type:
| Default ▼ |

Graph Options*
| Show legend left ▼ |

☐ Draw 3D graph
☐ Show values in graph
☑ Show horizontal grid
☐ Show vertical grid Target Options
○ Show none
○ Show Control Limits
◉ Show Targets

*All graph options can be changed once the graph has been displayed

Period to graph:
◉ Graph from  02/10/1999   to  02/10/2000
○ Graph  13   periods starting from  01/10/1999
○ Graph  13   periods ending with  02/10/2000

FIGURE 7

SYSTEM AND METHOD FOR UPDATING, MONITORING AND ANALYZING MEASUREMENTS

BACKGROUND

1. Field of the Invention

The present invention is directed to management systems and more specifically to a system and method for organizing enterprise performance data into discrete measurements whereby each measurement can be updated, viewed and reported over an electronic network.

2. Background of the Invention

Large enterprises such as corporations have a continuous need to, for example, manage large numbers of people and accurately track the progress of on-going or specific projects. To complicate matters, corporations are often geographically distributed, which precludes various employees from interacting with each other on a regular basis thereby making it difficult to update managers with status and progress information. Further, certain projects comprise a variety of sub-projects or different phases which makes it difficult for managers to accurately determine the progress of the overall project towards a predetermined goal.

While prior art management systems (computerized or manual) have attempted to aid in managing employees and projects, none has been capable of addressing the wide-ranging needs of field personnel, managers and corporate division directors, who each have differing needs and expectations from a management tool.

SUMMARY OF THE INVENTION

The present invention is a management system that centralizes the collection, dissemination and updating of specific performance characteristics, which are referred to herein as "measurements." In accordance with the present invention, each measurement describes a specific performance characteristic related to, for example, different parts of business operations, e.g., sales, marketing, research, development, manufacturing, etc. Thus, each measurement preferably includes a measurement description, measurement value and a date indicative of the measurement's most recent update. A measurement may represent a quantitative characteristic (e.g., a revenue figure or number of calls answered), a qualitative (e.g., quality of service—high, medium, low) or a combination characteristic. Since the management system of the present invention preferably is implemented over an electronic network, employees, managers, and even outside contractors can easily and efficiently access the management tools provided by the present invention.

In a preferred embodiment of the invention, individual measurements are grouped into "packages." A package of measurements preferably includes measurements related by project, organization or any other desired grouping. When a package is selected, all of the measurements associated with that package can be viewed simultaneously. Under some circumstances, a package may contain only a single measurement. However, a package typically comprises several measurements. Significantly, in accordance with the present invention, packages can be grouped together in a predetermined way by a system administrator and can also be custom-created. Additionally, any package can be shared among multiple users thereby reducing the amount of memory required for the overall system and making the sharing of information more simple.

Further, measurement values can be updated (by personnel having the necessary authority) on a semi-annual, quarterly, monthly, weekly, or even daily basis. The period of time between updates is referred to as the frequency of the measurement. Also, preferably associated with each measurement is default graphing information including, for example, a y-axis title, graph type, and $2^{nd}$ standard deviation control limits, whereby a graphical representation of the measurement can be quickly generated and useful information displayed for a user.

Also, a single target or multiple targets may be associated with measurements. A target is a value or range of values that identifies performance as "good" or "bad." A target preferably is "directional." That is, a target can be either increasing, meaning that a higher measurement value is better than a lower one, or decreasing, meaning that a lower measurement value is better than a higher one. In a preferred embodiment of the invention, a value of a measurement for which a target has been assigned is color-coded to indicate the status of the measurement value with respect to the target value. Accordingly, a manager, for example, need not read specific quantitative or qualitative values, but need only glance at a displayed listing of measurements to obtain a high level indication of a measurement's value.

In addition to color-coding, an indicator, e.g., an up or down arrow, preferably is also associated with each target and is displayed along with the target when the measurement is displayed for a user. The up or down arrow alerts the user that the target is associated with a measurement for which an increasing value is desirable (an up arrow) or for which a decreasing value is desirable (a down arrow).

The present invention also is operable with non-series performance characteristics (non-series measurements) or series performance characteristics (series measurements). A non-series, or stand-alone, measurement represents a single characteristic or event, e.g., the number of hours worked by a group of employees. On the other hand, in a series measurement, the measurement may be a general measure of some item that contains a series of characteristics or events that might describe the measurement in detail. In accordance with the present invention, each series item is assigned a value. For example, a measurement of "widgets produced per day" might contain a single series for each of 12 types of widgets. However, instead of always displaying all 12 separate measurements (one for each widget type), the present invention preferably displays a single measurement which is chosen as a representative measurement. Preferably, the chosen measurement is indicative of the overall performance of the related measurements. A target value preferably is also associated with the representative measurement.

It is therefore an object of the present invention to provide a system and method for monitoring and analyzing measurements.

It is also an object of the present invention to group measurements in packages which can viewed simultaneously by a user. Measurement packages preferably can also be shared among a plurality of users.

It is also an object of the present invention to provide a management system that operates over a network whereby users can be geographically distributed.

It is also an object of the present invention to provide a management tool that includes graphing capabilities wherein each measurement has default graphing settings.

It is still further an object of the present invention to provide a management system, method or tool that associates targets with individual measurements.

It is still further an object of the present invention to provide a color-coding scheme and/or indicators that permit a user to learn the status of one or more measurements without having to read actual measurement values.

It is also an object of the present invention to provide a management system or tool that accommodates measurements comprising multiple series.

These and other objects of the present invention will become apparent upon a reading of the detailed description of the invention in conjunction with the accompanying drawings.

DETAILED DESCRIPTION OF THE INVENTION

Figure 1:
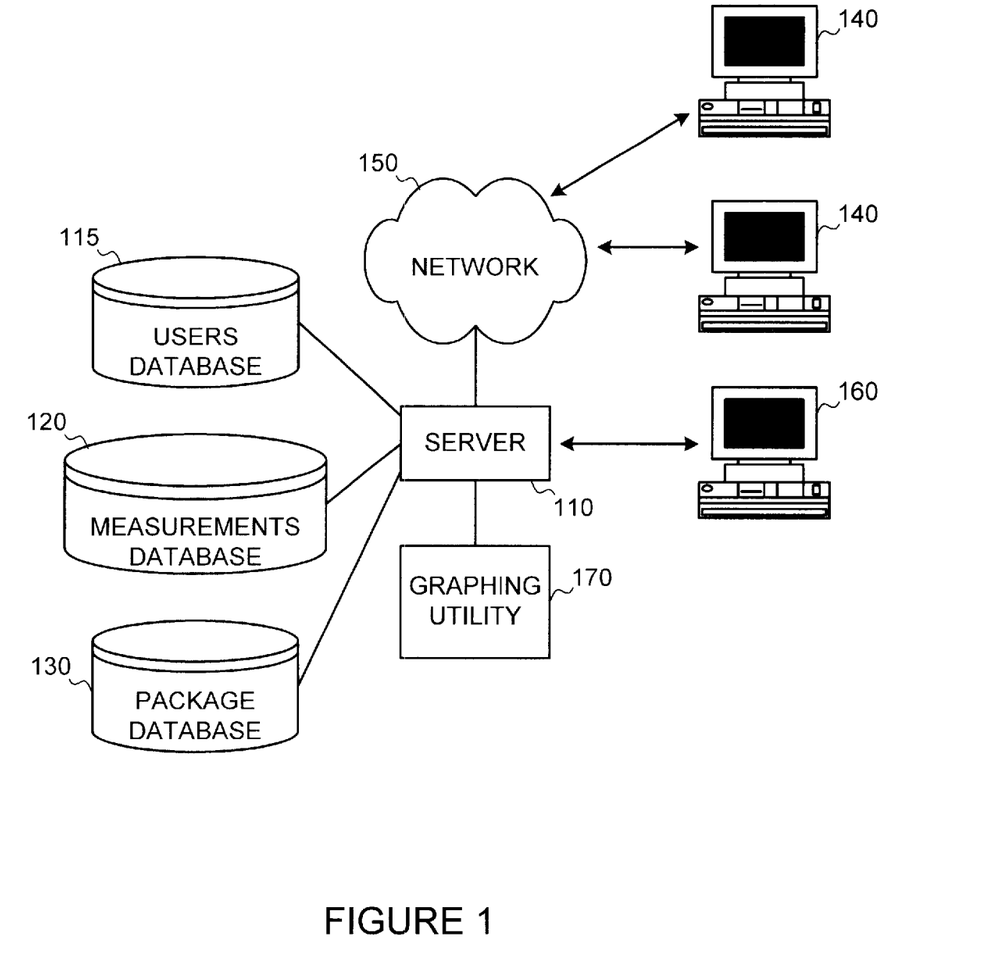
FIG. 1 is a schematic diagram illustrating an implementation of a preferred embodiment of the present invention.

FIG. 1 illustrates an implementation of a preferred embodiment of the present invention. An electronic computer operating as a server 110 is at the heart of the present invention.

Preferably server 110 is connected to a network 150 such as an intranet or the Internet. Configuring a server to operate in either of these modes is well known in the art. One or more computers or terminals 140 are connected to network 150 and can thus communicate with server 110 via network 150. In addition, a computer or terminal 160 may be directly connected to server 110, which potential delays that may be experienced over a network. Communication between server 110 and computers/terminals 140, 160 may be effected via TCP/IP or any other suitable protocol that permits electronic communication between terminals or computers. Further, each of the computers/terminals 140, 160 include well-known "browser" application software that enables computer/terminal 140, 160 to display one or more pages of information that are formatted using HTML, for example. Of course, any other computer format that is capable of communicating graphical and text information directly or over a network is also operable with the present invention. Terminals/computers 140, 160 can be geographically distributed such that people at different locations can still access system of the present invention.

Server 110 is in communication with users database 115, measurements database 120, package database 130 and graphing utility 170. Each of these components is described in more detail below.

Users of the present invention log on to server 110 using conventional methods. In accordance with the present invention, however, different users may have different levels of authorization. That is, a system administrator preferably has unlimited access to all components of the system, whereas some users might be authorized only to view measurements, as opposed to also being able to modify measurement data. Still other users preferably have authority to update measurement values and/or target values and or to change a default representative series, as will be more readily understood by the description that follows.

Users database 115 preferably stores all of the potential users of the system, their passwords, if required, and their authority level. In a preferred embodiment, a login screen (not shown) prompts a user to enter a valid user ID and password. The user ID and password are verified against the data in users database 115 and if the data input is properly matched to stored data, the user is given access to the system, to the extent that the user's authority level permits. If a user ID or password is not found in users database 115, that user is optionally nevertheless permitted access to the system, albeit with limited view-only "guest" privileges. Preferably, a user has the ability to change their password at any time. Furthermore, a system administrator preferably has the ability to add or delete users as well as edit an existing user's name, ID and/or authorization level.

Figure 2A:
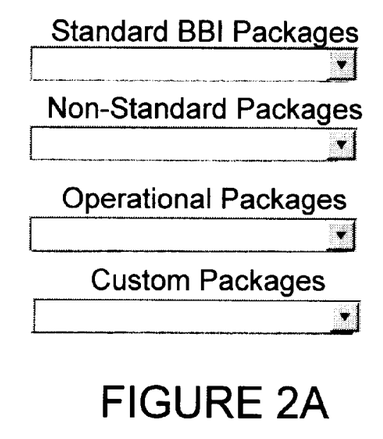
FIG. 2A shows exemplary pull-down menus for packages in accordance with the present invention.
Figure 2B:
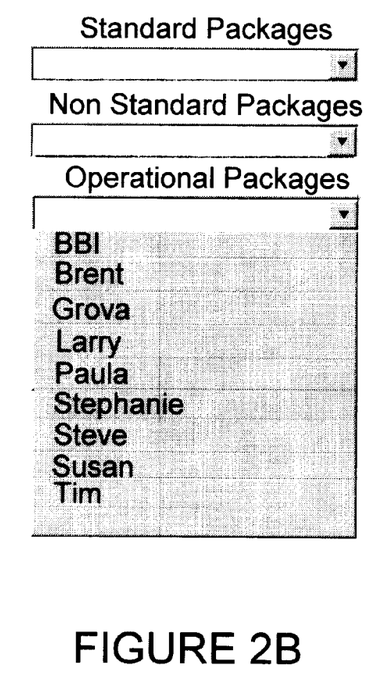
FIG. 2B shows a pull-down menu of FIG. 2A which has been pulled down.

Measurements database 120 stores a plurality of measurements and package database 130 stores groupings of measurements that are intended to be displayed together. FIG. 2A shows an exemplary pull-down menu that is preferably displayed to a user when that user has logged on to the system. The pull-down menus are organized to list packages logically associated with particular categories. For example, FIG. 2A shows a menu for standard packages, which may be groupings of measurements that are often requested by users. Non-standard packages may be groupings of measurements that are less frequently requested by users. Operational packages may be groupings of measurements that are useful to specific organizational departments of a corporation. Preferably, the packages that are listed in any of the three package menus described thus far are set up by a system administrator. FIG. 2B shows the operational packages pull-down menu including packages named for managers. A user selects one of the packages to view via such a pull-down menu.

Figure 3:
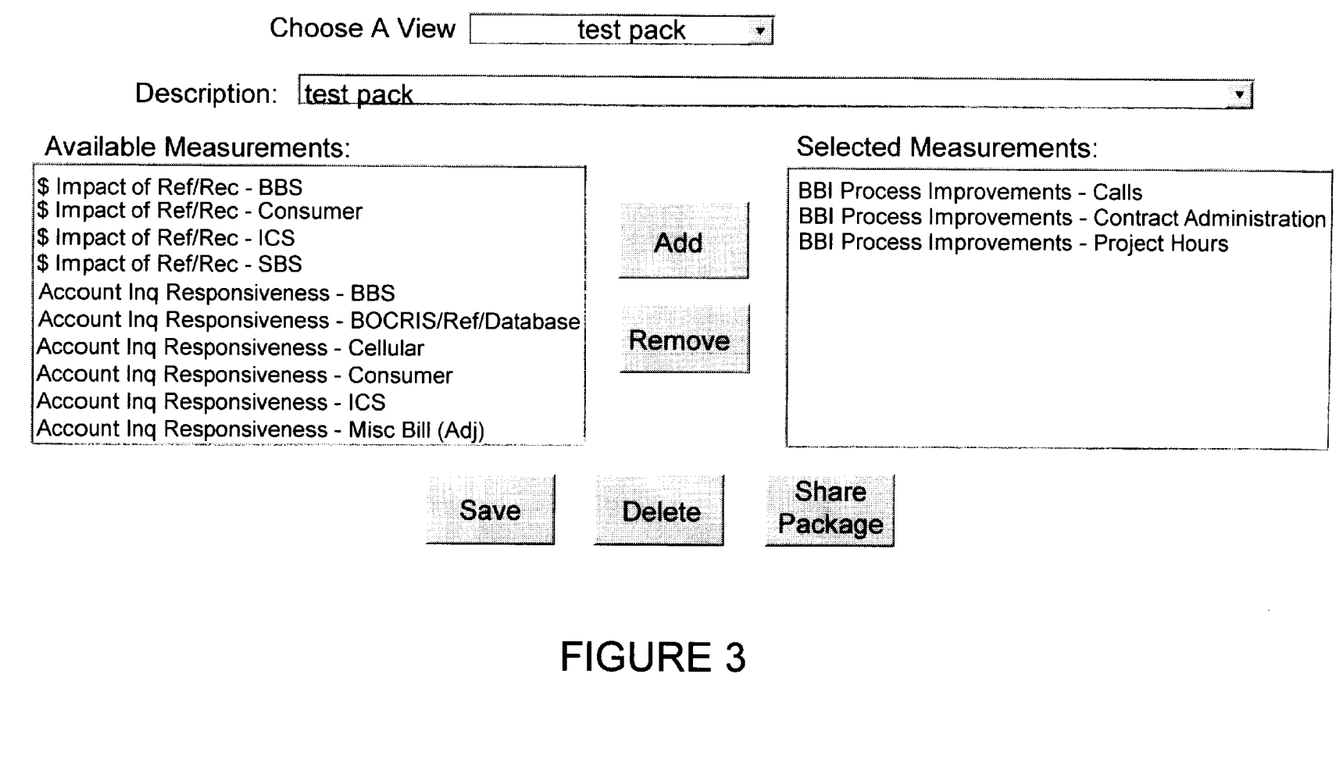
FIG. 3 shows an exemplary screen or page that is used to create custom packages in accordance with the present invention.

FIG. 3 shows an exemplary screen or page that is used to create custom packages. The left-hand box in FIG. 3 shows all of the available measurements (stored in measurements database 120) that may be selected to be part of a custom package, and the right-hand box displays the measurements that have been selected thus far using the "Add" button. Measurements may be deleted from the right-hand box using the "Delete" button. Once the desired measurements have been selected, the custom package preferably is saved with a unique name that is then listed under the custom packages pull-down menu of FIG. 2. As stated earlier, the groupings of measurements are stored in package database 130. That is, the information displayed in the pull-down-menus of FIG. 2A is stored in package database 130.

The exemplary display of FIG. 3 also includes a "share package" button, which, when invoked, flags the created custom package as one that can be shared with a plurality of users. Preferably, when this button is invoked, a list of users is displayed and the user who created the custom package then selects the users that are to have access to the shared package. Shared packages, if any, preferably appear on each of the selected user's custom packages menu. The share package feature of the present invention reduces the amount of memory necessary to store a plurality of custom packages that would otherwise have to be stored by different users. Also, the share package feature of the present invention provides an effective management tool whereby people can share and discuss data (i.e., measurements) that are of particular interest to them at a particular time.

A custom package can be thought of as a "local" package as compared to standard, non-standard or operational "global" packages. All users have access to global packages whereas only the user that created a custom package has access to that custom package. And, as explained, that user may make the custom package available to other users using the "share package" function. Thus, a custom package is uniquely associated with the user who created it and, possibly, also to a select number of users who have been given access to thereto via the share package function.

Figure 4:
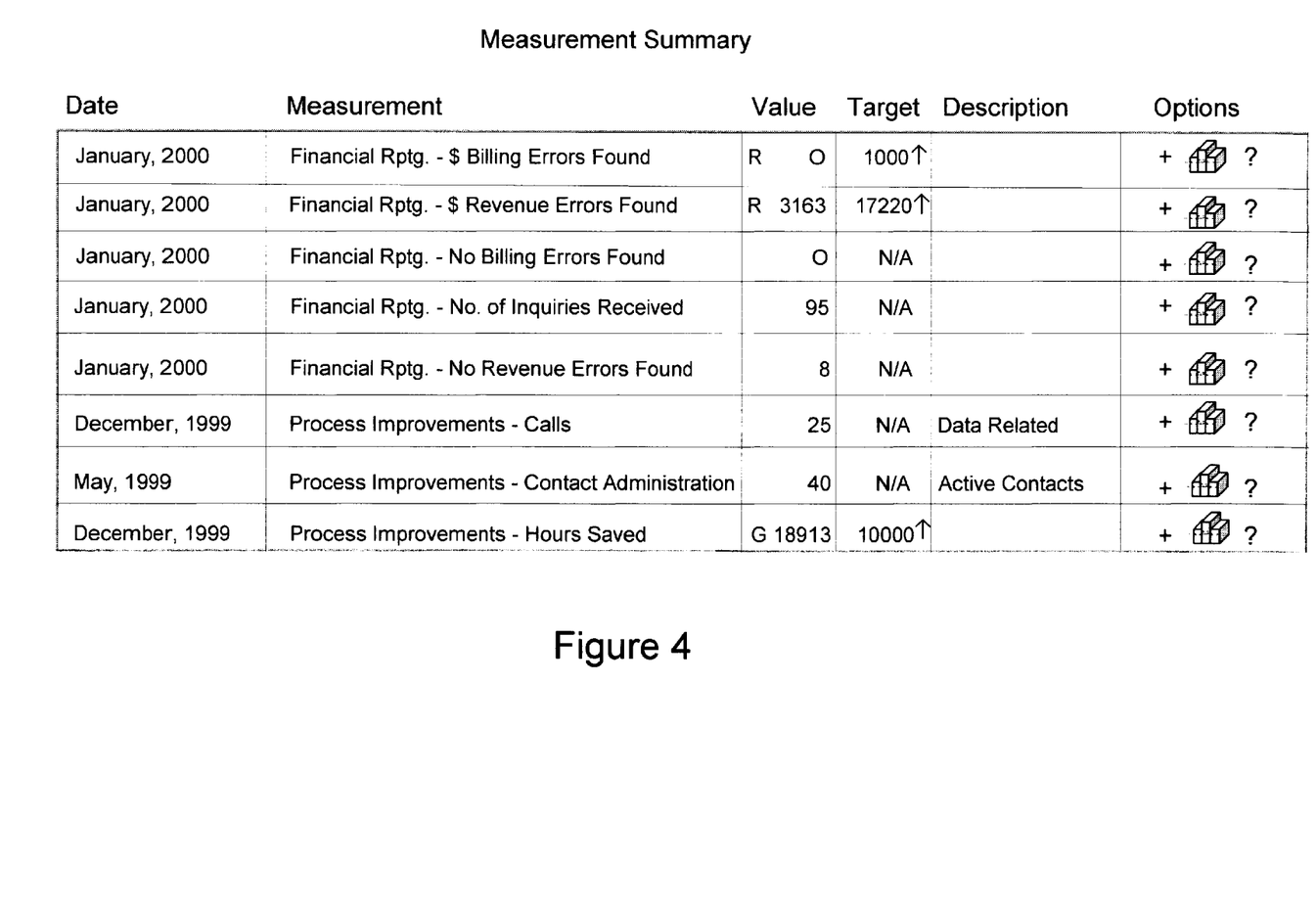
FIG. 4 shows an exemplary measurement summary screen or page listing a group of measurements, or a package, in accordance with the present invention.
Figure 5A:
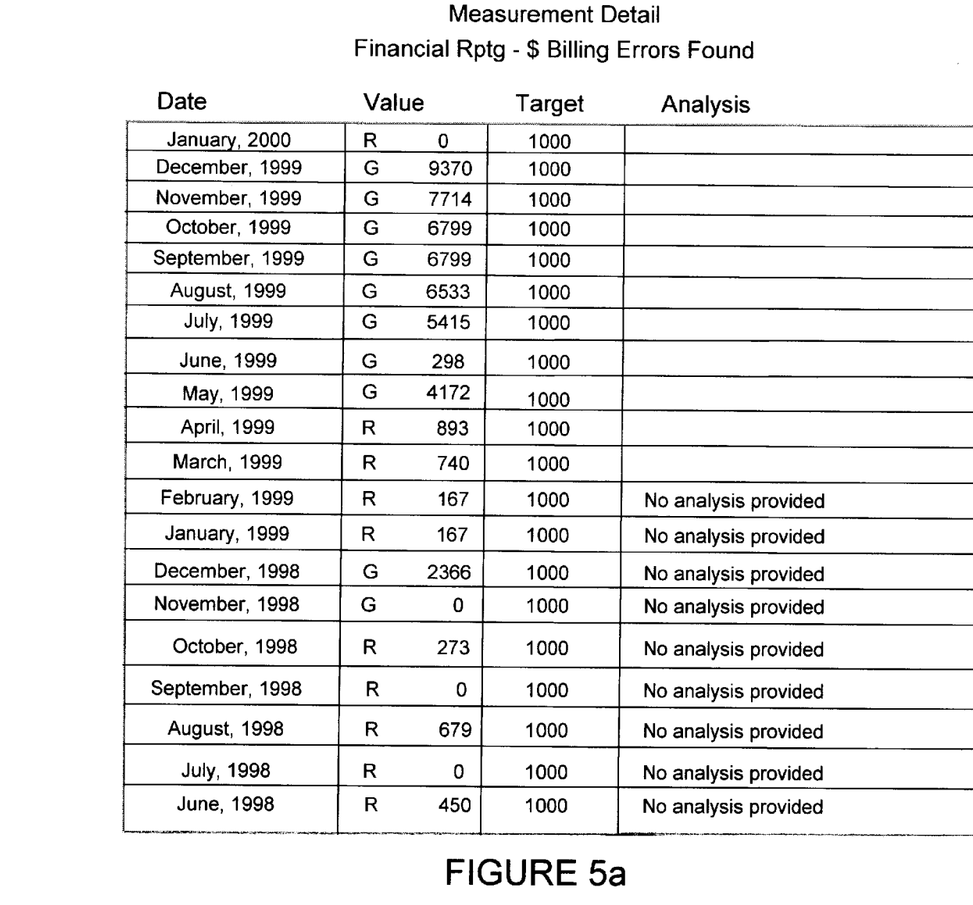
FIGS. 5A and 5B show exemplary measurement detail screens for, respectively, a non-series measurement and a series measurement, in accordance with the present invention.
Figure 5B:
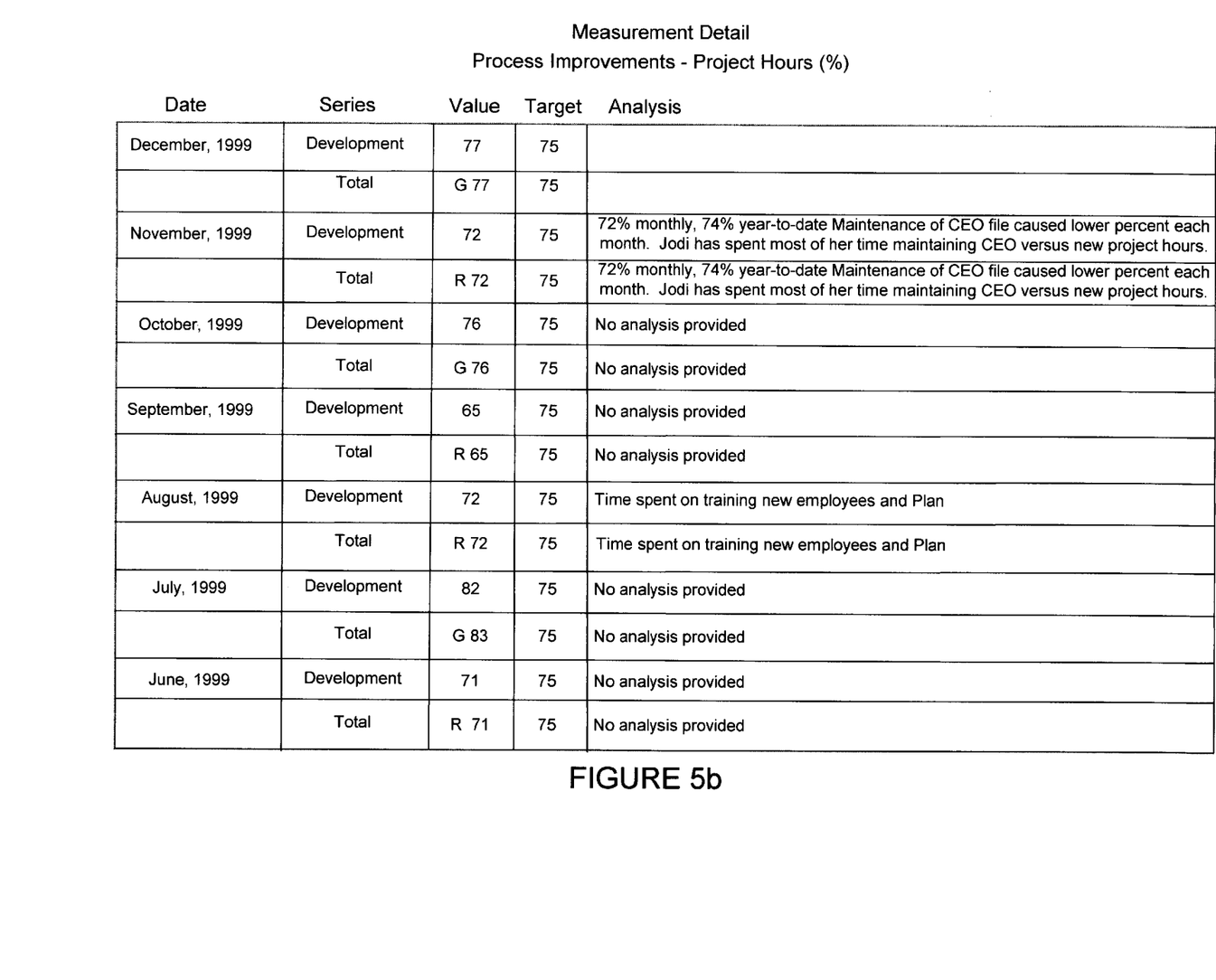

FIG. 4 shows an exemplary display of a plurality measurements grouped in a package and displayed together. FIG. 4 is a measurement summary screen (or page, using HTML terminology). Each line item (measurement) preferably contains the last date the measurement value was updated, a measurement description and a measurement value. Some measurements also include a measurement target value, an indicator (an arrow) as to whether the target is an increasing or decreasing target, a target series description (if the measurement is a multi-series measurement), and a set of options. The date field preferably is a hyperlink (indicated by the underlining) to a measurement detail page that shows historical data for that measurement. FIGS. 5A and 5B are exemplary measurement detail screens for, respectively, a non-series measurement and a series measurement (with two series measurements).

A series is a detailed breakout of a measurement. For example, a shipping company might be interested in tracking how long deliveries are taking. Thus, the shipping company tracks, e.g., the number of deliveries that are completed within 1–2 days, the number of deliveries that are completed in 3–5 days and the number of deliveries completed after 5 days. The measurement that is being tracked is "delivery completion" and comprises three series: 1–2 days, 3–5 days and greater than 5 days. Each series item thus has an associated value.

However, instead of displaying all 3 separate series, which might make viewing a summary page (like that of FIG. 4) difficult, preferably only one series of the measurement is displayed. The displayed series preferably is a representative series for the entire measurement.

The measurement detail page of FIGS. 5A or 5B preferably is accessed by "mouse-clicking" on the "hyperlink" date (in the first column of FIG. 4) corresponding to any measurement shown in FIG. 4, and shows all historical data for that measurement. Specifically, in FIG. 5A, each record has associated with it a unique date and value. FIG. 5B shows a measurement with two series, development and total, and values associated with each of those series. The date field preferably is shown only once for each set of series relating to the measurement on a particular date to more clearly identify the date-separated entries.

Each series has a value associated with it, and preferably, only one series has been identified as a representative series for the measurement. That series value preferably is color-coded as will be explained in more detail below. A series measurement listed on the measurement summary page of FIG. 4, for example, preferably includes an asterisk to identify the measurement as a series measurement.

In a preferred embodiment of the present invention, target values are associated with measurements. The target values may be selected by management personnel, for example, to give employees an idea of expected performance goals. One or more target values may be used depending on the type of measurement. That is, for a single dollar measurement value, a one target scheme preferably is used. On the other hand, where multiple values may have relevance such as in the shipping company example described above multiple target values may be appropriate. More specifically, in the shipping example, two targets could be set: one at 2 days and one at 5 days. Color coding of the measurement value field is provided by the present invention to provide a quick indication to a user how a present value of a measurement compares to the measurement's target value. If a measurement does not have a target value, then color coding preferably is not invoked.

Where a measurement includes one or more targets, the measurement value preferably is colored with one of four colors—blue, green, yellow, or red (of course any color code can be chosen as long as the desired information is properly conveyed thereby). Again, if there is no color, the measurement has no target values. Where a target is associated with a measurement, the color of a value entry of that measurement is chosen in accordance with Table 1, which includes color coding for measurement values with single and three targets. FIGS. 4, 5A and 5B indicate color coding by a letter "R" for red or "G" for green. In an actual implementation of the invention, however, the "R" and "G" letters are not provided, but the cell in which the measurement value is located is color coded with the appropriate color.

TABLE 1

| | |
|---|---|
| Increasing Target - Single Target Measurement | |
| Green color | Current value is greater than or equal to target value |
| Red color | Current value is less than target value |
| Decreasing Target - Single Target Measurement | |
| Green color | Current value is less than or equal to target value |
| Red color | Current value is higher than target value |
| Increasing Target - Three Target Measurement | |
| Blue color | Current value is higher than or equal to target 1 |
| Green color | Current value is less than the target 1 and greater than or equal to target 2 |
| Yellow color | Current value is less than target 2 and greater than or equal to target 3 |
| Red color | Current value is less than target 3 |
| Decreasing Target - Three Target Measurement | |
| Blue color | Current value is lower than or equal to target 3 |
| Green color | Current value is higher than target 3 and less than or equal to target 2 |
| Yellow color | Current value is higher than target 2 and less than or equal to target 1 |
| Red color | Current value is higher than target 1 |

For a measurement with multiple series, the target series preferably is the series that is most representative of the overall measurement and thus that series preferably serves as the basis for color coding. In addition, so that the user can obtain complete information from a relatively quick glance at a display screen, an indicator, such as an arrow like that shown in FIG. 4 within the target field, is provided. An up arrow indicates that the higher the measurement value the better, while a down arrow indicates that the lower the measurement value the better. The information conveyed by the arrow provides a clear meaning to the color coding of the measurement value since a user is quickly informed of the desired direction that the measurement value should be heading.

Figure 6:
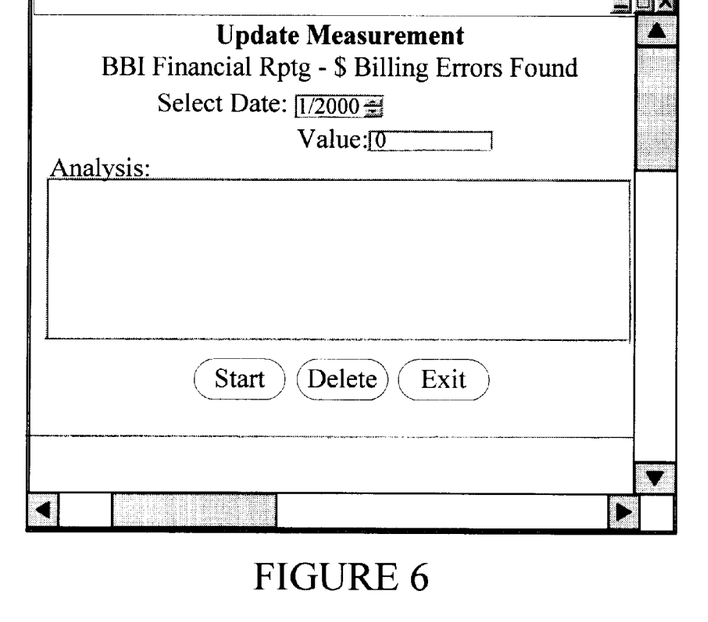
FIG. 6 shows an exemplary measurement update screen in accordance with the present invention.

Referring again back to FIG. 4, the measurement summary page, the second-to-last column is entitled target series description and is filled in only when a listed measurement is a series measurement. The last column in FIG. 4 is entitled options, and preferably three options (identified by icons) are available: "Update Measurement", "Graph Measurement" and "On-line Measurement Help". These icons preferably are hyperlinks that, when clicked on using a mouse for example, result in an appropriate page being displayed on the user's browser. Specifically, the plus sign, indicative of "update measurement", when "clicked," initiates the display of an update measurement screen like that shown in FIG. 6.

Preferably, the update option is only available to those users who are authorized to have update capability. The update page allows an authorized user to update the value of a measurement including an analysis field that is displayed in the measurement detail page like those shown in FIGS. 5A and 5B. An analysis can be entered for a particular date to describe or explain anomalies or variations in the expected results. Preferably, a measurement value can be updated for dates both prior to and beyond the current date, e.g., a date up to 3 years in advance and 3 years back in history.

Figure 7:
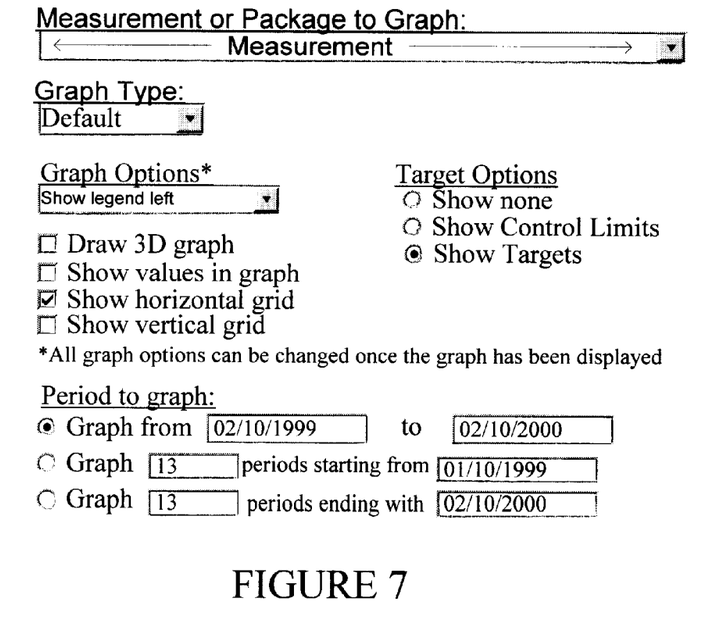
FIG. 7 depicts an exemplary graphing utility options screen in accordance with the present invention.

The next icon shown under the option heading in FIG. 4 is the icon (a bar graph) for graphing. FIG. 7 depicts an exemplary graphing utility options page in accordance with the present invention. The graphing utility is identified as 170 in FIG. 1 and allows graphical reporting of measurements and packages. A graph can be used to display the values of a single measurement or all the measurements in a package. The graphing utility options page is used to select the measurement or package that the user wants to view/print, the time span for the data contained in the graph, and other options for the graph, e.g., the type of graph and/or whether targets should be displayed on the graph. The default graph style preferably is set at the time a measurement is first entered in the measurements database 120. Preferably, graph options can also be changed in the finished graph, e.g. the size of the graph or captions, as is well known in the art. Choosing the graph utility option from the measurement summary page preferably displays a graph of the current measurement already selected.

The third icon under option is a question mark that may be selected to obtain system help. The help in this case preferably displays help for the particular measurement selected. Preferably, each measurement is associated with a separate help file, which is stored on or is accessible by server 110. When a user requests help for a particular measurement, the system retrieves the file associated with the measurement in question, converts it to HTML, for example, and displays it to the user. In this way, help files can be maintained and edited separately by a system administrator whereby individual users will always obtain the most up to date version of help.

As noted, the present invention is particularly useful for large geographically distributed entities that have the need to track and manage the progress and status of day-to-day operations and special projects. The present invention makes this possible by implementing the present management system over an electronic network whereby managers and employees can view and analyze measurement information without having to be geographically located together. Server 110 enables managers, employees and even outside contractors to view selected measurements, i.e., packages, and track/and or update the status of those measurements.

The foregoing disclosure of embodiments of the present invention and specific examples illustrating the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. For example, while the databases 115, 120 and 130 are described and shown separately, they may be implemented using a single memory device that may or not be physically associated with server 110. Thus, the scope of the invention is to be defined only by the claims appended hereto, and by their equivalents.

What is claimed is:

1. A method of tracking performance characteristics, comprising the steps of:
   (a) storing a plurality of measurements in a database;
   (b) organizing the plurality of measurements into packages;
   (c) associating respective target values with the measurements, at least two of the target values being different from one another;
   (d) displaying one of the packages on a display, wherein the measurements are displayed as line items including the respective target values;
   (e) color coding a given measurement value based on the relative value of the measurement value with respect to its target value; and
   (f) displaying respective indicators in proximity to the at least two target values that indicate whether a given target value is one of (i) an increasing target value and (ii) a decreasing target value,
   wherein the measurements and measurement values in combination with the target values facilitate tracking performance characteristics.

2. The method of claim 1, further comprising providing a plurality of computers connected to a network and practicing steps (d) and (f) on at least one of the computers.

3. The method of claim 1, further comprising updating one of the measurements.

4. The method of claim 1, further comprising providing default graphing settings and graphing one of the measurements.

5. The method of claim 4, further comprising modifying the default graphing settings.

6. The method of claim 1, further comprising creating a custom package.

7. The method of claim 6, wherein the custom package is uniquely associated with a user.

8. The method of claim 1, further comprising displaying a series measurement.

9. A method of tracking the performance of an organization, comprising the steps of:
   (a) connecting geographically distributed computers to an electronic network;
   (b) connecting a server to the electronic network;
   (c) storing a plurality of measurements in a database, the measurements including fields for an update date, a measurement description, a measurement value, a target value and a target value indicator;
   (d) displaying the measurements on at least one of the computers; and
   (e) color coding the measurement value based on the relative value of the measurement value with respect to the target value and with respect to whether the target value indicator represents an increasing target value or a decreasing target value, wherein the measurements and measurement values in combination with the target values facilitate tracking the performance of an organization.

10. The method of claim 9, wherein the target value indicator is an arrow.

11. The method of claim 9, wherein the electronic network is one of an intranet and the Internet.

12. The method of claim 9, further comprising creating a package that includes the measurement and displaying the package.

13. The method of claim 9, further comprising updating the measurement.

* * * * *